US008044948B2

(12) United States Patent
Lee

(10) Patent No.: US 8,044,948 B2
(45) Date of Patent: Oct. 25, 2011

(54) LIQUID CRYSTAL DISPLAY AND DRIVING METHOD THEREOF

(75) Inventor: Seung-Woo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 778 days.

(21) Appl. No.: 10/519,561

(22) PCT Filed: Nov. 8, 2002

(86) PCT No.: PCT/KR02/02076
§ 371 (c)(1),
(2), (4) Date: Sep. 22, 2005

(87) PCT Pub. No.: WO2004/003642
PCT Pub. Date: Jan. 8, 2004

(65) Prior Publication Data

US 2006/0097967 A1 May 11, 2006

(30) Foreign Application Priority Data

Jun. 28, 2002 (KR) ........................ 10-2002-0036980

(51) Int. Cl.
*G06F 3/38* (2006.01)
*G09G 5/00* (2006.01)

(52) U.S. Cl. ........... 345/209; 345/690; 345/204; 345/88

(58) Field of Classification Search .............. 345/94–96, 345/208–209
See application file for complete search history.

(56) References Cited

U.S. PATENT DOCUMENTS 3,740,743 A * 6/1973 Baron ........................... 345/157
3,925,777 A * 12/1975 Clark ............................ 368/155
5,576,729 A 11/1996 Yamazaki
6,160,535 A 12/2000 Park
6,335,719 B1 1/2002 An et al.
2001/0004253 A1* 6/2001 Fukutoku et al. ............... 345/96
2002/0130830 A1* 9/2002 Park ................................ 345/99

FOREIGN PATENT DOCUMENTS

CN 1120869 4/1996
CN 1134557 10/1996

(Continued)

OTHER PUBLICATIONS

European Search Report, corresponding to EP 02788925.2-2205 / 1525509 PCT/KR0202076, 24.07.08.

*Primary Examiner* — Alexander Eisen
*Assistant Examiner* — Cory Almeida
(74) *Attorney, Agent, or Firm* — Innovation Counsel LLP

(57) ABSTRACT

An LCD groups pixels in each row into a plurality of blocks, and calculates difference in gray between every two image data applied to a pair of adjacent odd and even pixels in each block including pixels in a row for each of first to third colors. It is determined that a block is first or second dot block depending on a sign of the gray difference when a magnitude of the gray difference between the odd pixel and the even pixel in each pair in the block for at least one color is equal to or larger than a critical value. A current block in a current row and in columns is determined to be a one-dot block when the current block is the first dot block and a previous block in a previous row and in the columns is the second dot block. When the number of the one-dot blocks is a predetermined percentage of the number of the total blocks, it is determined that a one-dot pattern is generated and one-dot inversion of the LCD is changed into another inversion. In this way, a pattern generating flicker is determined and the inversion type is changed for reducing the flicker.

15 Claims, 7 Drawing Sheets

FOREIGN PATENT DOCUMENTS

| | | |
|---|---|---|
| CN | 1158431 | 9/1997 |
| CN | 1231463 | 10/1999 |
| CN | 1341230 | 3/2002 |
| JP | 2000-020033 | 1/2000 |
| JP | 2000-029437 | 1/2000 |
| JP | 2001-042287 | 2/2001 |
| JP | 2002-091400 | 3/2002 |
| JP | 2002-149117 | 5/2002 |

* cited by examiner

LIQUID CRYSTAL DISPLAY AND DRIVING METHOD THEREOF

BACKGROUND OF THE INVENTION (a) Field of the Invention

The present invention relates to a liquid crystal display and a driving method thereof.

(b) Description of Related Art

A liquid crystal display (LCD) includes an upper panel including a common electrode and a plurality of color filters and covered with an alignment layer, a lower panel including a plurality of thin film transistors and a plurality of pixel electrodes and covered with an alignment layer, and a liquid crystal layer interposed between the upper panel and the lower panel. Data voltages and a common voltage are respectively applied to the pixel electrodes and the common electrode to generate electric fields, which determine orientations of liquid crystal molecules in the liquid crystal layer. The orientations of the liquid crystal molecules in turn determine transmittance of light passing through the liquid crystal layer and a desired image is displayed by controlling the voltages applied to the electrodes.

A polarity of a data voltage applied to a pixel is reversed between adjacent two frames. In addition, the data voltages in a frame for the different pixels do not have the same polarity. This technique of differentiating the polarity of the data voltages for the pixels is called inversion, and the types of the inversion include column inversion, one-dot inversion, double-dot inversion and so on.

The column inversion reverses the polarity of the data voltages for adjacent pixel columns. The one dot inversion and the double-dot inversion perform a line inversion as well as the column inversion. The one-dot inversion reverses the polarity of the data voltages for the pixels connected to a current gate line with respect to that for the pixels connected to a previous gate line. The two-dot inversion reverses the polarity of the data voltages for the pixels connected to the current two gate lines with respect to that for the pixels connected to the previous two gate lines.

When an image displayed on a screen has a pattern like the one-dot inversion and the column inversion, flicker is generated on the screen. The flicker is resulted from the difference in luminance of the pixels supplied with the data voltages with opposite polarities.

SUMMARY OF THE INVENTION

A motivation of the present invention is to provide a method of changing inversion type when a pattern generating flicker is determined.

The present invention changes the inversion type when a pattern generating flicker is determined.

A liquid crystal display according to an embodiment of the present invention includes a liquid crystal panel including a plurality of the data lines, a plurality of the gate lines, and a plurality of pixels arranged in a matrix, and the pixels include first to third color pixels. A data driver applies data voltages required for image display to the data lines. A signal controller receives a plurality of first to third color image data, supplies the received image data to the data driver, and generates control signals for driving the liquid crystal panel. The signal controller changes an inversion type when dot blocks are repeated in a predetermined pattern, each dot block includes a predetermined number of successive pairs of adjacent two pixels included in at least one color pixels among the first to third color pixels, and a magnitude of difference in gray between two pixels in each pair is equal to or larger than a critical value.

The dot blocks may include first and second dot blocks with the gray differences of opposite signs, and the predetermined pattern may include a first dot block in a first row and a second dot block located in the same columns as the first dot block and in a second row adjacent to the first row.

Alternatively, the predetermined pattern includes a first dot block in a first row and a second dot block located in the same columns as the first dot block and in a second row adjacent to the first row, and the first and second blocks have the gray differences of an equal opposite sign.

Preferably, the pixels in each row are grouped into a plurality of blocks, each block including even number of pixels, and the signal controller determines whether each block is one of the dot blocks. The signal controller may include a block counter for counting ordinal of each block among the blocks in a row and a line counter for counting ordinal of a row including each block in the row.

It is preferably that the block counter counts the blocks by counting clock cycles after a data enable signal indicating sections for inputting the image data becomes a high level, and the line counter counts the rows based on timing of a data enable signal indicating sections for inputting the image data for a row or on timing of a horizontal synchronization signal.

A method of driving a liquid crystal display according to an embodiment of the present invention calculates difference in gray between every two image data applied to a pair of adjacent odd and even pixels in each block including pixels in a row for each of first to third colors. It is determined that a block is first or second dot block depending on a sign of the gray difference when a magnitude of the gray difference between the odd pixel and the even pixel in each pair in the block for at least one color is equal to or larger than a critical value. It is determined a pattern formed by first and second dot blocks located in adjacent row and the same columns. An inversion type of the liquid crystal display is changed when the pattern is repeated in the entire pixels.

When determining the pattern, it is preferably determined whether a previous block in a previous row and in columns is the first or second dot block when a current block in a current row and the columns is the first or second dot block.

Preferably, the current block is determined to be a one-dot block when the current block is the first dot block and the previous block is the second dot block, and the number of the one-dot blocks is compared with the number of total blocks.

When both the current block and the previous block are the first dot blocks or the second dot blocks, it is preferable that the current block is determined to be a double-dot block, and the number of the double-dot blocks is compared with the number of the total blocks. The number of the double-dot blocks may be preferably compared with the total number of the first and second dot blocks when the total number of the first and second dot blocks is equal to or larger than a predetermined number of the total number of the blocks.

The current block is determined to be a first double-dot block when both the current block and the previous block are the first dot blocks. Likewise, the current block is determined to be a second double-dot block when both the current block and the previous block are the second dot blocks. The inversion type is preferably changed when the number of the first dot blocks is larger than a first critical value and the number of the first double-dot blocks is equal to a predetermined percentage of the number the first dot blocks, or the number of the second dot blocks is larger than a second critical value and the number of the second double-dot blocks is equal to a predetermined number of the second dot blocks.

DETAILED DESCRIPTION OF PREFERRED EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

Now, liquid crystal displays and driving methods thereof according to an embodiment of the present invention will be described in detail with reference to the accompanying drawings.

First, a schematic configuration of an LCD according to an embodiment of the present invention and flicker generated in an LCD are described with reference to FIGS. 1-3.

Figure 1:
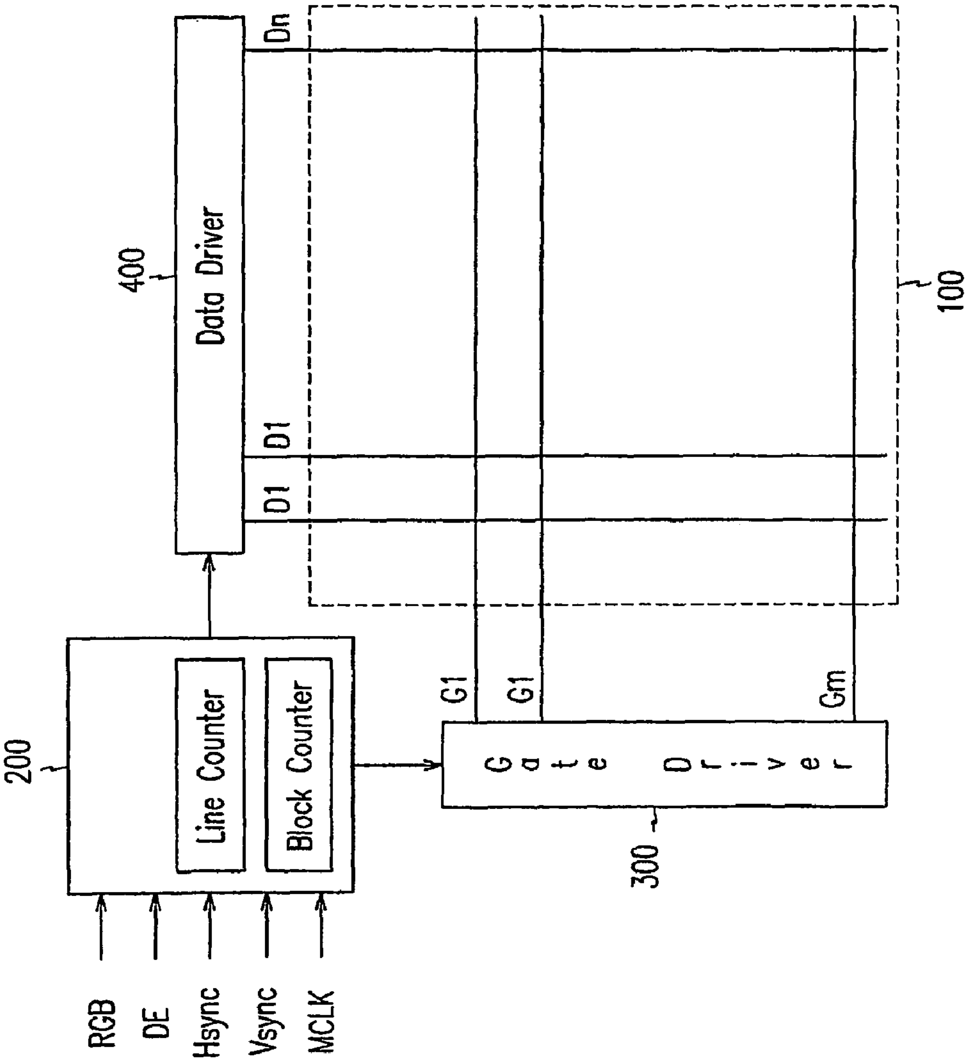
FIG. 1 is a schematic block diagram of an LCD according to an embodiment of the present invention.
Figure 2:
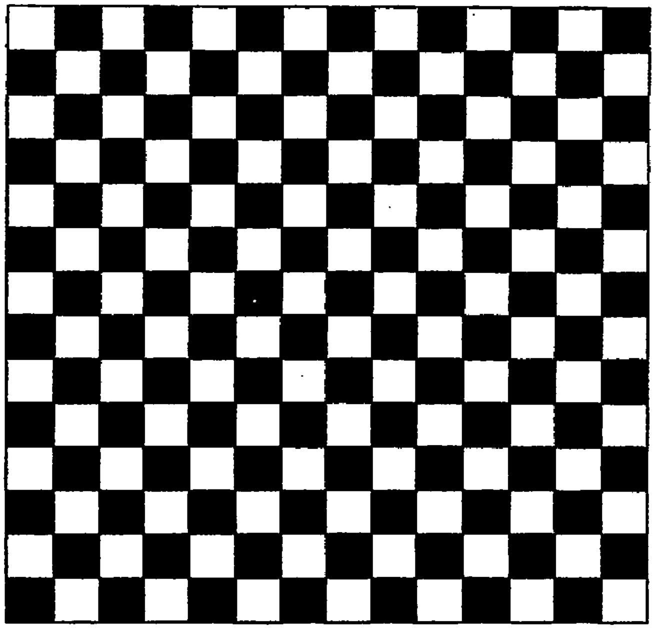
FIGS. 2 and 3 show images that generate flicker in an LCD subject in one-dot inversion and column inversion, respectively.
Figure 3:
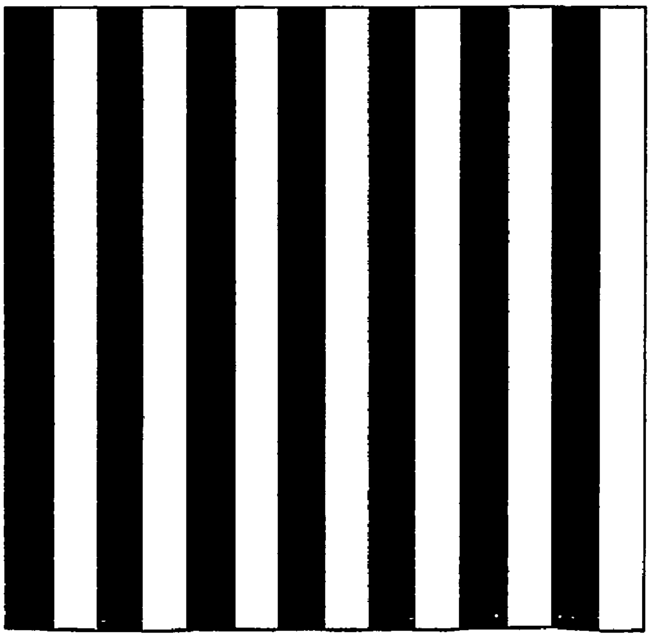

FIG. 1 is a block diagram of an LCD according to an embodiment of the present invention, and FIGS. 2 and 3 show images that generate flicker in an LCD subject in one-dot inversion and column inversion, respectively.

Referring to FIG. 1, an LCD according to an embodiment of the present invention includes a liquid crystal panel 100, a signal controller 200, a gate driver 300, and a data driver 400.

The liquid crystal panel 100 includes a plurality of a plurality of gate lines G1-Gm extending in a transverse direction and a plurality of the data lines D1-Dn extending in a longitudinal direction. Two gate lines and two data lines define a pixel area, which is occupied by a pixel.

The signal controller 200 receives a plurality of red (R), green (G) and blue (B) image data from an external graphics controller (not shown), a vertical synchronization signal Vsync for distinguishing frames, a horizontal synchronization signal Hsync for distinguishing rows, a data enable signal DE having a high level during the output of the image data for indicating valid image data, and a main clock MCLK. The signal controller 200 processes and provides the RGB image data for the data driver 400, and generates a plurality of control signals for controlling the gate driver 300 and the data driver 400.

The gate driver 300 generates scanning signals from a gate-on voltage and a gate-off voltage supplied from a driving voltage generator (not shown) and it applies the scanning signals to the gate lines in synchronization with the control signals supplied from the signal controller 200.

The data driver 400 selects data voltages from a plurality of gray voltages supplied from a gray voltage generator (not shown) based on the image data supplied from the signal controller 200, and it applies the selected data voltages to appropriate data lines in response to the control signals supplied from the signal controller 200.

When the LCD subject to inversion such as one-dot inversion displays an image (referred to as one-dot pattern hereinafter) shown in FIG. 2 or the LCD subject to column inversion display an image (referred to as column pattern hereinafter) shown in FIG. 3, flicker may be generated.

This embodiment groups the pixels into a plurality of blocks, each block including a predetermined number of successive pixels in a row, and analyzes a pattern of each block for determining the one-dot pattern or the column pattern. A multiple of the number of the pixels in a block is preferably equal to a horizontal resolution.

It is assumed that the number of the pixels in each block is N, and the number of the blocks is M. For example, an SXGA LCD with a resolution of 1280×1024 includes 81,920 blocks when N=16.

The signal controller 200 analyzes a pattern to be displayed by the image data for each block and determines whether the pattern generates the flicker. The signal controller 200 changes the inversion type if the pattern is determined to generate the flicker. The signal controller 200 includes a line counter 210 and a block counter 220 for calculating the ordinals of each block, i.e., for determining which line (row) the block belongs to and how the block stands in the line. The line counter 210 and the block counter 220 count based on the data enable signal DE or the synchronization signals Hsync and Vsync.

For example, the line counter 210 counts the lines by counting high level sections of the data enable signal DE when RGB image data for a line is inputted during a high level section of the data enable signal after a pulse of the vertical synchronization signal Vsync. Alternatively, the line counter 210 counts the lines by counting high level sections of the horizontal synchronization signal Hsync.

The block counter 220 counts the blocks by raising one for every predetermined number of the periods of the main clock MCLK during a high level section of the data enable signal DE since the image data for a pixel or a plurality of pixels are transmitted in synchronization with the main clock MCLK Accordingly, the block counter 220 counts one for N periods of the main dock MCLK when the RGB image data for one pixel are transmitted for a clock. Alternatively, the block counter 220 starts counting after a predetermined number of clocks from the input of a pulse of the horizontal synchronization signal Hsync when the data enable signal DE becomes high after the predetermined number of clocks after the pulse of the horizontal synchronization signal Hsync.

A method of changing the inversion type of an LCD according to an embodiment of the present invention after the determination of the pattern causing the flicker is described in detail with reference to FIGS. 4-8.

This embodiment calculates the difference in gray of the RGB image data between two adjacent pixels in a block, and increases the value of a positive dot pixel value BP or a negative dot pixel value BN when any one of the gray differences of the respective RGB image data is larger than a critical value. Then, this embodiment determines a type of the block from the positive dot pixel value BP or the negative dot pixel value BN and thus the pattern to be formed by the block to determine the generation of the flicker.

First, a method of changing the inversion type of an LCD subject to the one-dot inversion upon the determination of the generation of the flicker is described in detail with reference to FIGS. 4, 5A and 5B.

Figure 4:
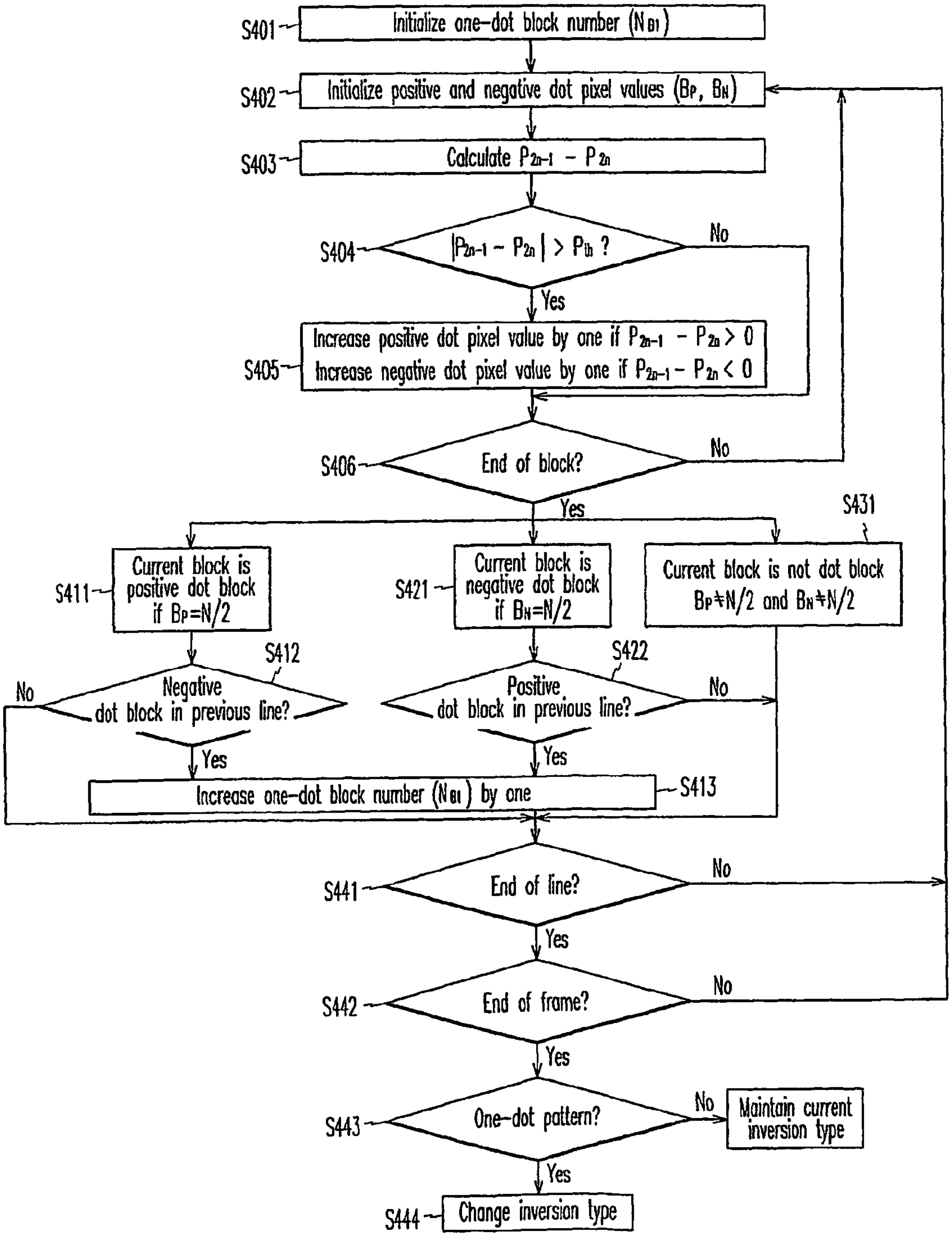
FIGS. 4, 6 and 8 are flow charts illustrating methods of changing the inversion type according to embodiments of the present invention.
Figure 5A:
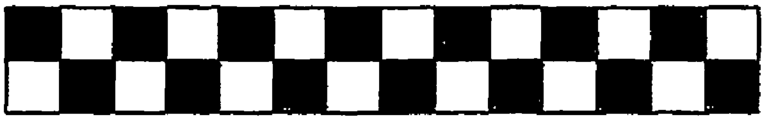
FIGS. 5A and 5B show one dot block.
Figure 5B:
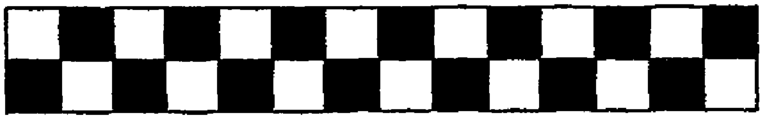

FIG. 4 is a flow chart illustrating a method of changing the inversion type according to an embodiment of the present invention, and FIGS. 5A and 5B show one dot blocks.

As shown in FIG. 4, the value of a register representing the number NB1 of one-dot blocks is initialized when a frame starts (S401), and a pair of registers representing a positive dot pixel values BP and a negative dot pixel values BN (S402).

The positive dot pixel value BP is defined as the number of pairs of adjacent odd and even pixels satisfying Relation 1, where the gray of the odd pixel is larger than that of the even pixel. Likewise, the negative dot pixel value BN is defined as the number of pairs of adjacent odd and even pixels such that the gray of the odd pixel is smaller than that of the even pixel.

$$|P_{2n-1}-P_{2n}|>Pth, \quad (1)$$

where $P_{2n-1}$ and $P_{2n}$ indicate the grays of the odd pixel and the even pixel, respectively, Pth indicates the critical value, and n is a natural number from 1 to N/2.

The gray difference ($P_{2n-1}-P_{2n}$) between an odd pixel and an even pixel adjacent to each other in a block is calculated (S403), and it is determined whether the absolute value of the gray difference ($P_{2n-1}-P_{2n}$) is larger than the critical value Pth as shown in Relation 1 (S404). The signal controller 200 determines the grays $P_{2n-1}$ and $P_{2n}$ of the pixels from image data received from a graphics controller. The gray differences for the RGB are independently determined, and the critical values Pth may be different for the RGB. In particular, since a dot pattern for the green color G is easily perceived compared with the red color R and the blue color B even though the gray difference ($P_{2n-1}$-$P_{2n}$) is small, the critical value Pth for the green color G is set to be smaller than those for the red and blue colors R and B. For example, the critical values Pth for the red, green and blue colors R, G and B are 16, 8 and 16, respectively.

When any of the RGB image data for the pair of the odd and even pixels satisfies Relation 1, the positive dot pixel value BP is increased by one if the gray difference ($P_{2n-1}-P_{2n}$) calculated in the step S403 is positive, while the negative dot pixel value BN is increased by one if the gray difference ($P_{2n-1}-P_{2n}$) is negative (S405). When Relation 1 is not satisfied in the step S404 or after the step S405 is completed for those satisfying Relation 1, it is determined whether the pixel pair is the last pair of the block (S406). If it is determined that the pixel pair is not the last pair of the block, the procedure returns to the step (S404) such that the gray difference of a next pair of adjacent two pixels is calculated. However, if it is determined that the pixel pair is the last pair, it is determined whether the block corresponds to a one-dot block since the gray differences for all pairs of the adjacent two pixels in the block are calculated.

In detail, if the positive dot pixel value BP is equal to half of the number N of the pixels in the block, it is written into a memory that the current block is a positive dot block (S411), it is determined from block information of a previous line stored in the memory whether a block in the previous line located at an equivalent position as the current block is a negative dot block (S412). The line counter 210 and the block counter 220 confirm which block belongs to the previous line and stands at the equivalent position in the previous line as the current block. The memory may be incorporated in the signal controller 200 or external to the signal controller. If it is determined that the current block is a positive dot block and the equivalent block in the previous line is a negative dot block as shown in FIG. 5A, the number NB1 of the one-dot blocks are increased by one (S413).

Likewise, if the negative dot pixel value BN is equal to N/2, it is written into the memory that the current block is a negative dot block (S421), it is determined from the block information of the previous line stored in the memory whether the equivalent block in the previous line is a positive dot block (S422). If it is determined that the current block is a negative dot block and the equivalent block in the previous line is a positive dot block as shown in FIG. 5B, the number NB1 of the one-dot blocks are increased by one (S413).

If both the positive dot pixel value BP and the negative dot pixel value BN are not equal to N/2, it is written into the memory that the current block is not a dot block (S431).

After it is determined that the current block is a one-dot block, it is determined whether the current block is the last block in the line (S441). For example, when a block includes 16 pixels, the block counter 220 counts the blocks by considering the image data for 16 pixels based on internal or external dock of the signal controller 200. Since an SXGA LCD includes 80 blocks in a line, it is determined that the current block is the last block when the count value of the block counter 220 is equal to 80. If the count value of the block counter 220 is not equal to 80, it is determined whether a next block is a one-dot block through the steps S402 to S441.

If the current block is determined to be the last block of the block, it is determined whether the line including the block is the last line, i.e., located at an end of a frame through the line counter 210 (S442). The line counter 210, as described above, counts the lines whenever the data enable signal DE or the horizontal synchronization signal Hsync becomes an enable state, and it is determined to be the end of the frame if the count number of the line counter 210 reaches the vertical resolution of the LCD. If the current line is not the end of the frame, the count value of the block counter 220 is initialized and the determination for blocks of a next line is performed through the steps S402 to S442.

After the determination for all blocks in a frame through the steps S401 to S442 is finished, it is determined whether the number NB1 of the one-dot blocks is equal to a value that results in the determination that the current frame displays a one-dot pattern (S443). For example, it is assumed that the current frame displays a one-dot pattern if the one-dot blocks in a frame occupy 60% of the total blocks in a frame. The n, it is determined whether the number NB1 of the one-dot blocks is equal to or larger than 49,152 (=81,920×0.6) for an SXGA panel when each block includes 16 pixels.

If the current frame is determined to display a one-dot pattern, the signal controller 200 changes the one-dot inversion into another inversion type (S444). For example, column inversion is adapted for a dual-source panel.

The above-described embodiment of the present invention reduces the flicker by changing the one-dot inversion generating the flicker into another inversion type.

Although the above-described embodiment illustrates the change of the one-dot inversion generating the flicker into another inversion type, the column inversion may generate flicker, which will be described with reference to FIGS. 6, 7*a* and 7*b*.

Figure 6:
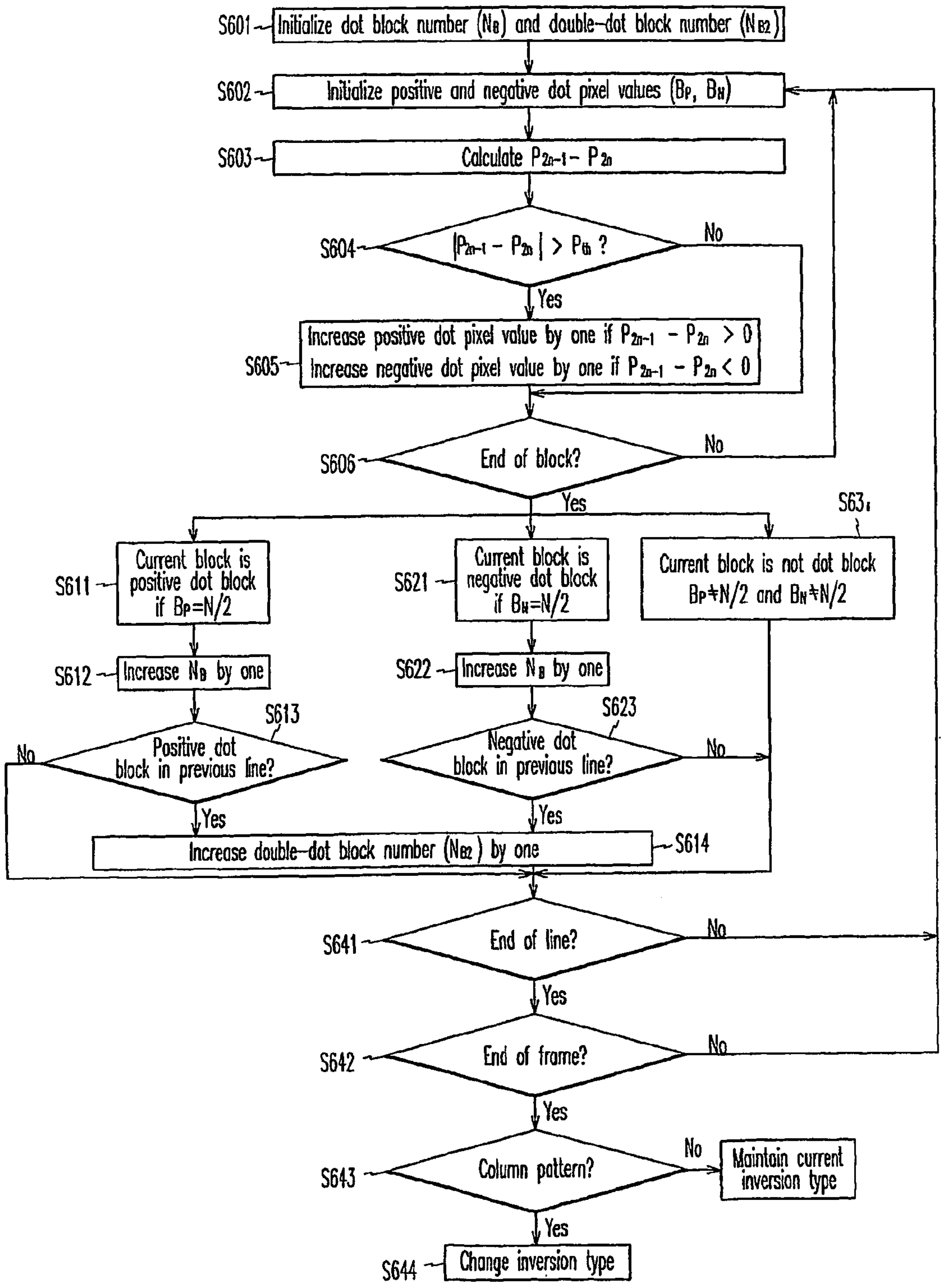
Figure 7A:
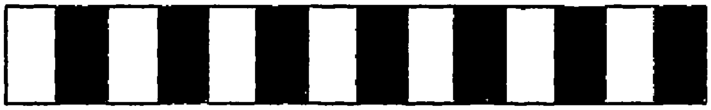
FIGS. 7*a* and 7*b* show double-dot blocks.
Figure 7B:

FIG. 6 is a flow chart illustrating a method of changing the inversion type according to another embodiment of the present invention, and FIGS. 7*a* and 7*b* show double-dot blocks.

A method for changing the column inversion into another inversion, when a column pattern is determined, is similar to that shown in FIG. 4 except that a double-dot block is determined when both of two equi-positional blocks in two adjacent lines are positive dot blocks or negative dot blocks.

In detail, the values of registers indicating the number NB of dot blocks and the number NB2 of double-dot blocks are initialized as shown in FIG. 6 (S601), and the values of registers indicating a positive dot pixel value BP and a negative dot pixel value BN for a block is initialized (S602). Next, the positive dot pixel value BP and the negative dot pixel value BN of a current block are calculated by the gray comparison shown in Relation 1 like the steps S403 to S406 shown in FIG. 4 (S603~S606).

When the positive dot pixel value BP for the block is equal to N/2, it is written into a memory that the current block is a positive dot block (S611) and the number NB of the dot blocks is increased by one (S612). In addition, it is determined from block information of a previous line stored in the memory whether an equi-positional block in the previous line is a positive dot block (S613). If both the two blocks are positive dot blocks as shown in FIG. 7*a*, the number NB2 of the double-dot blocks is increased by one (S614).

Likewise, the negative dot pixel value BN is equal to N/2, it is written into a memory that the current block is a negative dot block (S621), the number NB of the dot blocks is increased by one (S622). In addition, it is determined from block information of the previous line stored in the memory whether an equi-positional block in the previous line is a negative dot block (S623). If both the two blocks are negative dot blocks as shown in FIG. 7B, the number NB2 of the double-dot blocks is increased by one (S614).

If both the positive dot pixel value BP and the negative dot pixel value BN are not equal to N/2, it is written in the memory that the current block is not a dot block (S631).

After it is determined whether the current block is a dot block or a double-dot block, it is determined whether the current block is the last block in the line as illustrated in the step S441 shown in FIG. 4 (S641). If it is determined that the current block is not the last block of the line, it is determined whether a next block is a one-dot block or a double-dot block through the steps S602 to S641. If the current block is determined to be the last block of the block, it is determined whether the line including the block is located at an end of a frame as shown in the step S442 shown in FIG. 4 (S642). If the current line is not the end of the frame, the count value of the block counter 220 is initialized and the determination for blocks of a next line is performed through the steps S602 to S642.

After the determination for all blocks in a frame through the steps S601 to 계S642 is finished, it is determined whether the number NB2 of the double-dot blocks is equal to a value that results in the determination that the current frame displays a column pattern (S643). For example, a currant frame is determined to display a column pattern when the number NB of the dot blocks is equal to 60% of the number M of the total blocks and the number NB2 of the double-dot blocks is equal to 90% of the number NB of the dot blocks. Alternatively, a current frame is determined to display a column pattern when the number NB2 of the double-dot blocks is equal to a predetermined percentage of the number M of the total blocks. If the current frame is determined to display a column pattern, the signal controller 200 changes the column inversion into another inversion (S644).

The above-described embodiment of the present invention reduces the flicker by changing the column inversion into another inversion upon the generation of a column pattern.

Although the embodiment shown in FIG. 6 determines the generation of the flicker based on successive positive and negative dot blocks, they may be separately determined, which will be described hereinafter with reference to FIG. 8.

Figure 8:
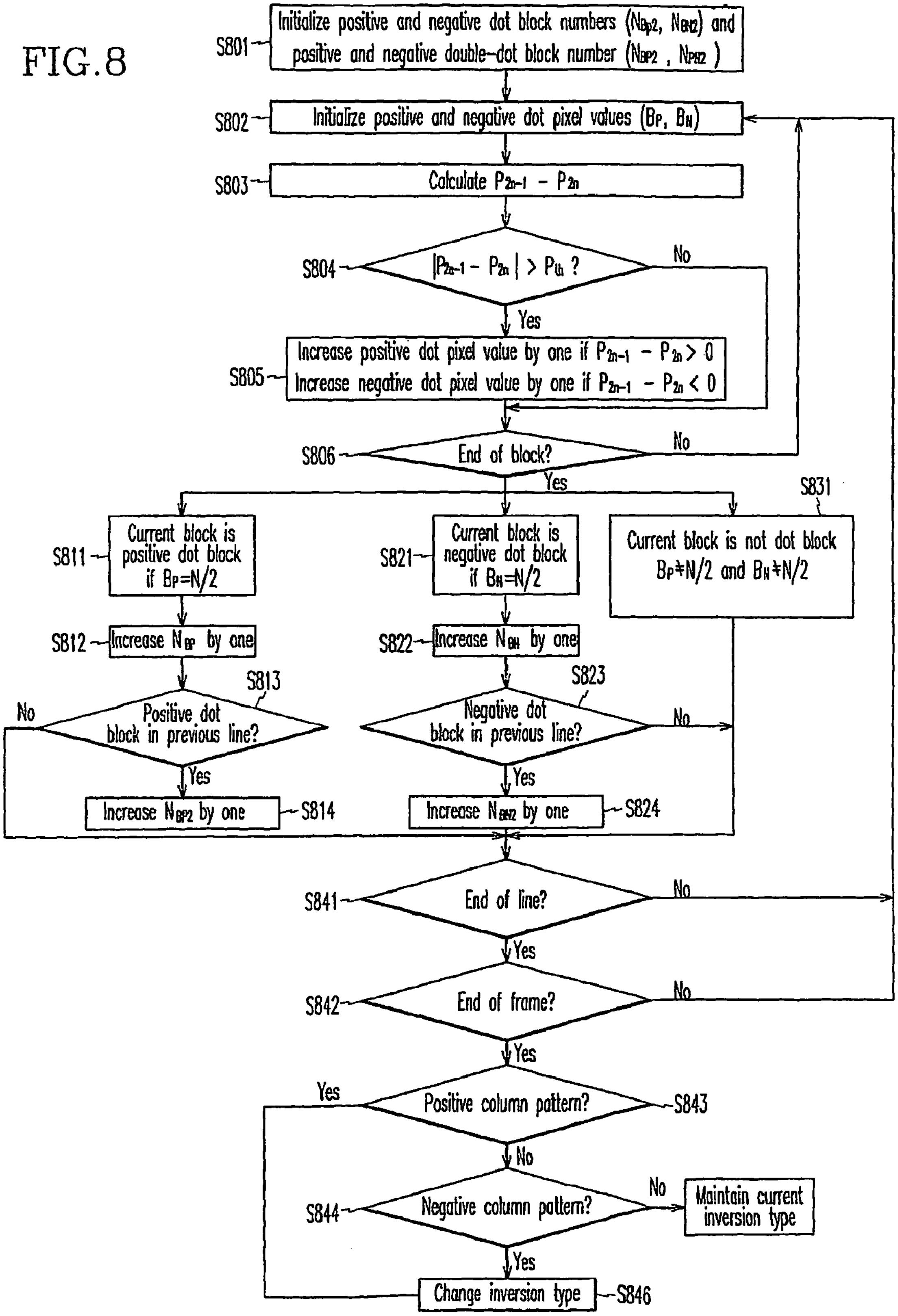

FIG. 8 is a flow chart illustrating a method of changing the inversion type according to another embodiment of the present invention.

A method for changing the inversion type according to the embodiment of the present invention shown in FIG. 8 is similar to that shown in FIG. 6 except that positive double-dot blocks and negative double-dot block are stored in different manner.

In detail, the values of registers indicating the number NBF of the positive dot blocks, the number NBN of the negative dot blocks, the number NBP2 of the positive double-dot blocks, and the number NBN2 of the negative double-dot blocks are initialized (S801), and the values of registers indicating a positive dot pixel value BP and a negative dot pixel value BN for a block is initialized are initialized (S802). Next, the positive dot pixel value BP and the negative dot pixel value BN of a current block are calculated by the gray comparison shown in Relation 1 like the steps S603 to S606 shown in FIG. 6 (S803~S806).

When the current block is a positive dot block, it is written that the current block is a positive dot block (S811) and the number NBP of the positive dot blocks is increased by one like the steps S611 to S613 shown in FIG. 6 (S812). It is determined whether a dot block of a previous line is a positive dot block (S813), and the number NBP2 of the positive double-dot blocks is increased by one if the dot blocks of both the current line and the previous line are positive dot blocks (S814).

Likewise, when the current block is a negative dot block, it is written that the current block is a negative dot block (S821), the number NBN of the negative dot blocks is increased by one (S822). It is determined whether a dot block of a previous line is a negative dot block (S823), the number NBN2 of the negative double-dot blocks is increased by one if the dot blocks of both the current line and the previous line are negative dot blocks (S824).

If both the positive dot pixel value BP and the negative dot pixel value BN are not equal to N/2, it is written that the current block is not a dot block (S831).

Next, it is determined whether each block in a frame is positive or negative dot block or positive or negative double-dot block like the steps S641 and S642 shown in FIG. 6 (S841 and S842). After the determination for all blocks in a frame through the steps S801 to 5842, it is determined whether a current frame displays a column pattern. The current frame is determined to display a (positive) column pattern and the inversion type is changed when the number NBP of the positive dot blocks is equal to or larger than a critical value of the number M of the total blocks and the number NBP2 of the positive double-dot blocks is equal to or larger than a critical value of the number NBP of the positive dot blocks (S843). When the condition illustrated in the step S843 is not satisfied, it is determined whether the number NBN of the negative dot blocks is equal to or larger than a critical value of the number M of the total blocks and the number NBN2 of the negative double-dot blocks is equal to or larger than a critical value of the number NBN of the negative dot blocks. If the condition is satisfied (i.e., a negative column pattern is generated), the inversion type is changed (S844). The sequence of the steps S843 and S844 may be exchanged.

The present invention reduces flicker by determining patterns causing flicker from the image data for the pixels and changing the inversion type upon the determination of the patterns resulting in the flicker.

While the present invention has been described in detail with reference to the preferred embodiments, those skilled in the art will appreciate that various modifications and substitutions call be made thereto without departing from the spirit and scope of the present invention as set forth in the appended claims.

What is claimed is:

1. A liquid crystal display comprising:

a liquid crystal panel including a plurality of the data lines extending in a column direction, a plurality of the gate lines in a row direction, and a plurality of first to third color pixels displaying image based on signals received from the data lines and the gate lines and arranged in a matrix;

a data driver configured to apply data voltages required for image display to the data lines; and a signal controller configured to receive a plurality of first to third color image data for the first to third color pixels, supply the received image data to the data driver, and generate control signals required for driving the liquid crystal panel, wherein the signal controller changes an inversion type when 1) dot blocks are repeated in a predetermined pattern, each dot block including one or more pairs of adjacent pixels in a row for at least one of the first to third color pixels, and 2) a magnitude of difference in gray between the pixels in each pair is larger than a critical value in each dot block, wherein the predetermined pattern includes a first dot block in a first row and a second dot block located in the same columns as the first dot block in a second row adjacent to the first row, wherein the first dot block has the gray differences of a first sign, and the second dot block has the gray differences of a second sign that is opposite to the first sign, wherein the signal controller determines whether each dot block is the first dot block or the second dot block, and wherein the signal controller comprises:

a line counter for determining a row to which the block belongs; and a block counter for determining the position of the block in the row.

2. The liquid crystal display of claim 1, wherein the critical value has the first to third values for the first to third colors, and the first to third values are equal or different.

3. The liquid crystal display of claim 2, wherein the first to third colors are red, green and blue colors, respectively, and the second value is smaller than the first and third values.

4. The liquid crystal display of claim 1, wherein the pixels in each row are grouped into a plurality of blocks, each block including even number of pixels.

5. The liquid crystal display of claim 1, wherein the block counter counts the blocks by counting clock cycles after a data enable signal indicating sections for inputting the image data becomes a high level.

6. The liquid crystal display of claim 1, wherein the block counter counts the blocks by counting clock cycles after a predetermined number of clocks from raise of a horizontal synchronization signal to be input to the signal controller to a high level.

7. The liquid crystal display of claim 1, wherein the line counter counts the rows based on timing of a data enable signal indicating sections for inputting the image data for a row or on timing of a horizontal synchronization signal.

8. A method of driving a liquid crystal display including a liquid crystal panel including a plurality of the data lines extending in a column direction, a plurality of the gate lines in a row direction, and a plurality of pixels arranged in a matrix, and a signal controller receiving a plurality of the RGB image data and generating control signals for driving the liquid crystal panel, the method comprising:

calculating a difference in gray between every two image data applied to a pair of adjacent odd and even pixels in each block including pixels in a row for each of first to third colors;

determining that a block is first or second dot block depending on a sign of the gray difference when a magnitude of the gray difference between the odd pixel and the even pixel in each pair in the block for at least one color is larger than a critical value, the first dot block having the gray differences of a first sign, and the second dot block having the gray differences of a second sign that is opposite to the first sign;

determining whether a previous block in a previous row and the same column is the first or second dot block when a current block in a current row and the same column is the first or second dot block, wherein the current block is determined to be a one-dot block when the current block is the first dot block and the previous block is the second dot block; and changing an inversion type of the liquid crystal display when the number of the one-dot blocks is larger than a predetermined value, wherein the signal controller comprises:

a line counter for determining a row to which the block belongs; and a block counter for determining the position of the block in the row.

9. The method of claim 8, wherein the critical value has the first to third values for the first to third colors, and the first to third values are equal or different.

10. The method of claim 9, wherein the first to third colors are red, green and blue colors, respectively, and the second value is smaller than the first and third values.

11. The method of claim 9, wherein the rows including the blocks are counted based on timing of a data enable signal indicating sections for inputting the image data for a row or on timing of a horizontal synchronization signal.

12. The method of claim 9, wherein the blocks are counted by counting clock cycles after a horizontal synchronization signal to be input to the signal controller becomes in a high level.

13. A liquid crystal display, comprising:

a liquid crystal panel including a plurality of the data lines extending in a column direction, a plurality of the gate lines in a row direction, and a plurality of first to third color pixels displaying image based on signals received from the data lines and the gate lines and arranged in a matrix;

a data driver configured to apply data voltages required for image display to the data lines; and a signal controller configured to receive a plurality of first to third color image data for the first to third color pixels, supply the received image data to the data driver, and generate control signals required for driving the liquid crystal panel, wherein the signal controller changes an inversion type when 1) dot blocks are repeated in a predetermined pattern, each dot block including one or more pairs of adjacent pixels in a row for at least one of the first to third color pixels, and 2) a magnitude of difference in gray between the pixels in each pair is larger than a critical value in each dot block, wherein the predetermined pattern includes a first dot block in a first row and a second dot block located in the same columns as the first dot block in a second row adjacent to the first row, wherein the first and second blocks have the gray differences of a first sign or the first and second blocks have the gray differences of a second sign that is opposite to the first sign, wherein the signal controller determines whether each block is the first dot block or the second dot block, and wherein the signal controller comprises:

a line counter for determining a row to which the block belongs; and a block counter for determining the position of the block in the row.

14. A method of driving a liquid crystal display including a liquid crystal panel including a plurality of the data lines extending in a column direction, a plurality of the gate lines in a row direction, and a plurality of pixels arranged in a matrix, and a signal controller receiving a plurality of the RGB image data and generating control signals for driving the liquid crystal panel, the method comprising:

calculating a difference in gray between every two image data applied to a pair of adjacent odd and even pixels in each block including pixels in a row for each of first to third colors;

determining that a block is first or second dot block depending on a sign of the gray difference when a magnitude of the gray difference between the odd pixel and the even pixel in each pair in the block for at least one color is larger than a critical value, the first dot block having the gray differences of a first sign, and the second dot block having the gray differences of a second sign that is opposite to the first sign;

determining whether a previous block in a previous row and the same column is the first or second dot block when a current block in a current row and the same column is the first or second dot block, wherein the current block is determined to be a double-dot block when both the current block and the previous block are the first dot blocks or the second dot blocks; and changing an inversion type of the liquid crystal display when the number of the double-dot blocks is larger than a predetermined value, wherein the signal controller comprises:

a line counter for determining a row to which the block belongs; and a block counter for determining the position of the block in the row.

15. A method of driving a liquid crystal display including a liquid crystal panel including a plurality of the data lines extending in a column direction, a plurality of the gate lines in a row direction, and a plurality of pixels arranged in a matrix, and a signal controller receiving a plurality of the RGB image data and generating control signals for driving the liquid crystal panel, the method comprising:

calculating a difference in gray between every two image data applied to a pair of adjacent odd and even pixels in each block including pixels in a row for each of first to third colors;

determining that a block is first or second dot block depending on a sign of the gray difference when a magnitude of the gray difference between the odd pixel and the even pixel in each pair in the block for at least one color is larger than a critical value, the first dot block having the gray differences of a first sign, and the second dot block having the gray differences of a second sign that is opposite to the first sign;

determining whether a previous block in a previous row and the same column is the first or second dot block when a current block in a current row and the same column is the first or second dot block, wherein the current block is determined to be a first double-dot block when both the current block and the previous block are the first dot blocks, or the current block is determined to be a second double-dot block when both the current block and the previous block are the second dot blocks; and changing an inversion type of the liquid crystal display when the number of the first dot blocks is larger than a first critical value and the number of the first double-dot blocks is larger than a predetermined number of the first dot blocks, or the number of the second dot blocks is larger than a second critical value and the number of the second double-dot blocks is larger than a predetermined number of the second dot blocks, wherein the signal controller comprises:

a line counter for determining a row to which the block belongs; and a block counter for determining the position of the block in the row.

* * * * *